Patented June 27, 1939

2,163,922

UNITED STATES PATENT OFFICE 2,163,922

PRODUCTION OF METAL HYDROXIDES COLLOIDALLY SOLUBLE IN WATER

Fritz Stoewener, Ludwigshafen-on-the-Rhine, Germany, assignor to I. G. Farbenindustrie Aktiengesellschaft, Frankfort - on - the - Main, Germany No Drawing. Application March 6, 1935, Serial No. 9,589. In Germany March 29, 1934

11 Claims. (Cl. 252—6)

The present invention relates to the production of metal hydroxides which are colloidally soluble in water.

It has already been proposed to produce metal hydroxides colloidally soluble in water or their solutions by causing salts of trivalent metals, as for example of iron or chromium and especially of aluminium, to act in approximately stoichiometrical ratio on agents which are suitable to decompose the said salts with the formation of hydroxides, the resulting hydroxides being freed from salts formed during the decomposition and subjected to a treatment with peptizing agents.

I have now found that the said products, especially colloidal alumina, can also be obtained in good yields by employing in the said process "ammonia substances", that means, dissolved liquid or gaseous ammonia or other nitrogen compounds suitable for the formation of hydroxides, as for example ammonium sulphides, ammonium carbonates, ammonium carbamate, urea, pyridine, aniline or solutions of these substances in amounts deviating from the stoichiometrical proportions of the components, the mixture obtained after the reaction of the metal salts with the decomposition agent preferably after separation of the liquid constituents, being subjected to a careful or cautious drying before or during the peptization.

For example if aluminium nitrate be precipitated with ammonia and the mixture obtained after the reaction filtered, and the washed residue then treated with an amount of hydrochloric acid equivalent for example to 10 per cent of the amount stoichiometrically necessary for the formation of aluminium chloride, the mixture being peptized in the usual manner by heating under reflux and filtered, only a very small amount of water-soluble alumina is obtained by evaporation of the filtrate containing the colloidal constituents if the proportions of the components employed for the reaction deviate considerably from the stoichiometrical proportions. If on the other hand, the washed mass is simply carefully dried, as for example at from 80° C. to 120° C., together with the hydrochloric acid, that is during the peptization, colloidally soluble alumina is obtained in good yields even when the proportions of the components deviate considerably from the stoichiometrical proportions. Good yields are also obtained when the washed mass is dried in a careful manner, while mildly heating said mass, as for example at from 100° to 120° C., and then peptized.

Still better results are obtained when the mixture obtained by the reaction of the metal salts with a large excess or deficiency of ammonia is subjected to a careful drying before the washing process, the mass then being lixiviated and peptized in the dry or wet state, it being also of advantage in this case to dry the hydroxide in a protective manner together with the peptizing agent.

It is especially suitable first to separate liquid constituents (mother liquor) from the mixture obtained by the reaction, as for example on a rotary filter or with a filter press, to dry at between 100° and 120° C. the residue consisting of metal hydroxide and containing large amounts of salts, to stir the resulting mass with the mother liquor, to effect a further separation into mother liquor and residue, preferably by means of a centrifuge, to wash the residue thoroughly with a little water, to dry to a content of from 65 to 75 per cent of $Al_2O_3$, if desired, and then to peptize, the hydroxide in this case also being dried in a careful manner before or after, but preferably during, the peptization. By working in this manner, not only is heat saved in the evaporation of the mother liquor because the latter is concentrated by the absorption of salts by stirring with the dry product containing salts, but a hydroxide capable of being readily washed is obtained.

A deficiency of ammonia of up to about 10 per cent or any desired excess of ammonia, as for example 50 per cent or more may be employed, the ammonia escaping in the gaseous phase during the drying being collected or the still slightly acid or ammoniacal ammonium nitrate solution being neutralized with a little ammonia or nitric acid to avoid loss of nitrogen. In particular, solid crystallized aluminium nitrate, if desired freed from iron, (which may be obtained by crystallization from acid clay decomposition liquors, also freed from iron if desired), may be caused to react in a closed vessel with liquefied or gaseous ammonia, extracted with liquid ammonia and the ammonia remaining in the alumina removed at moderate temperatures or by means of steam, an alumina being thus obtained which by peptization with simultaneous protective drying yields a practically quantitative yield of water-soluble alumina.

The resulting colloidal oxides or hydroxides may be employed for the purposes hereinbefore specified.

The following example will further illustrate the nature of this invention but the invention is not restricted to this example.

Example 2000 kilograms of an aluminium nitrate solution containing 4.71 per cent by weight of aluminium and 7.16 per cent by weight of nitrogen are caused to react in a ball mill while grinding for an hour with 1375 kilograms of aqueous ammonia containing 18.98 per cent by weight of $NH_3$, i. e. with 150 per cent of the amount of ammonia stoichiometrically necessary. The readily filterable mixture is filtered on a suction filter. The filter cake is dried at from 80° to 100° C., the vapors being sucked off and condensed; the cake is stirred for a short time with the mother liquor arising from the filtration, a very readily filterable and washable mass being thus obtained which is again filtered on a suction filter. The filter cake is thoroughly washed on the suction filter with small amounts of water containing some ammonia, the washing water being united with the said condensate and the mother liquor. The mixture obtained contains from 97 to 98 per cent of the total nitrogen employed in the form of a concentrated ammonium nitrate solution. The precipitate, the further purification of which is usually unnecessary, and which contains about 272 kilograms of $Al(OH)_3$ and the residual amount of ammonium nitrate, is kneaded with 5 per cent of the amount of peptizing agent necessary for the formation of salts, as for example with 50 kilograms of 38 per cent hydrochloric acid, 53 kilograms of 62 per cent nitric acid or 31 kilograms of glacial acetic acid, the whole thus being liquefied to form a colloidal solution which is clarified if necessary by means of a centrifuge while employing a collodion filter. By careful drying, as for example by spraying, gels with a content of about 70 per cent of $Al_2O_3$ may be obtained which are soluble with swelling in cold water.

In the claims the term "ammonia substances" means liquid or gaseous ammonia or other nitrogen compounds suitable for the formation of hydroxides, as for example ammonium sulphides, ammonium carbonates, ammonium carbamate, urea, pyridine, aniline or solutions of these substances.

What I claim is:—

1. The process of producing reversible colloidal metal hydroxides which comprises causing a salt of a trivalent metal selected from the group consisting of aluminium, chromium and iron to act on an "ammonia substance" capable of binding the acid radical of the metal salt, said acid radical being capable of being bound by said ammonia substance, with the formation of trivalent hydroxide in an amount deviating from the stoichiometrical ratio of the components, freeing the hydroxide obtained from the salt formed during the decomposition and peptizing it by treating with a peptizing agent in an amount forming only a fraction of the amount stoichiometrically necessary for the formation of the normal metal salt and subjecting the mass to at least one cautious drying operation not impairing the water solubility of the product, said cautious drying including the application of mild heat to said mass, said freeing and said peptizing being performed in any desired sequence, and the first of said cautious drying operations being performed at any desired stage between the formation of the hydroxide and the end of the peptization.

2. The process of producing reversible colloidal metal hydroxides which comprises causing a salt of a trivalent metal selected from the group consisting of aluminium, chromium and iron and having an acid radical which can be bound with ammonia to act on ammonia in an amount deviating from the stoichiometrical ratio of the components, subjecting the mixture resulting from the reaction to a careful drying not impairing the water solubility of the product, said careful drying including the application of mild heat to said mixture, washing the mass and peptizing it by treating with a peptizing agent in an amount forming only a fraction of the amount stoichiometrically necessary for the formation of the normal metal salt.

3. The process of producing reversible colloidal metal hydroxides which comprises causing a salt of a trivalent metal selected from the group consisting of aluminium, chromium and iron and having an acd radical which can be bound with ammonia to act on ammonia in excess, subjecting the mixture resulting from the reaction to a careful drying not impairing the water solubility of the product, said careful drying including the application of mild heat to said mixture, washing the mass and peptizing it by treating with a peptizing agent in an amount forming only a fraction of the amount stoichiometrically necessary for the formation of the normal metal salt.

4. The process of producing reversible colloidal metal hydroxides which comprises causing a salt of a trivalent metal selected from the group consisting of aluminium, chromium and iron to act on an "ammonia substance" capable of binding the acid radical of the metal salt, said acid radical being capable of being bound by said ammonia substance with the formation of trivalent hydroxide, in an amount deviating from the stoichiometrical ratio of the components, freeing the hydroxide obtained from the salt formed during the decomposition, subjecting the hydroxide before it is completely peptized to a careful drying not impairing its water solubility, said careful drying including the application of mild heat to said hydroxide and treating it with a peptizing agent in an amount forming only a fraction of the amount stoichiometrically necessary for the formation of the normal metal salt.

5. The process of producing reversible colloidal metal hydroxides which comprises causing a salt of a trivalent metal selected from the group consisting of aluminium, chromium and iron and having an acid radical which can be bound with ammonia to act on ammonia in an amount deviating from the stoichiometrical ratio of the components, freeing the hydroxide obtained from the salt formed during the decomposition, subjecting the hydroxide before it is completely peptized to a careful drying not impairing its water solubility, said careful drying including the application of mild heat to said hydroxide and treating it with a peptizing agent in an amount forming only a fraction of the amount stoichiometrically necessary for the formation of the normal metal salt.

6. The process of producing reversible colloidal metal hydroxides which comprises causing a salt of a trivalent metal selected from the group consisting of aluminium, chromium and iron and having an acid radical which can be bound with ammonia to act on ammonia in excess, freeing the hydroxide obtained from the salt formed during the decomposition, subjecting the hydroxide before it is completely peptized to a careful drying not impairing the water solubility, said careful drying including the application of mild heat to said hydroxide and treating it with a peptizing agent in an amount forming only a fraction of the amount stoichiometrically necessary for the formation of the normal metal salt.

7. The process of producing reversible colloidal metal hydroxides which comprises causing a salt of a trivalent metal selected from the group consisting of aluminium, chromium and iron and having an acid radical which can be bound with ammonia to act on ammonia in excess, subjecting the mixture resulting from the reaction to a careful drying not impairing the water solubility of the product, washing the mass, subjecting the hydroxide before it is completely peptized to a careful drying not impairing water solubility, its said careful drying operations including the application of mild heat to said mixture and hydroxide, respectively, and treating it with a peptizing agent in an amount forming only a fraction of the amount stoichiometrically necessary for the formation of the normal metal salt.

8. The process of producing reversible colloidal metal hydroxides which comprises causing a salt of a trivalent metal selected from the group consisting of aluminium, chromium and iron and having an acid radical which can be bound with ammonia to act on ammonia in excess, freeing the hydroxide obtained from the salt formed during the decomposition and then subjecting the hydroxide to a careful drying not impairing the water solubility of the product, peptizing it by treating with a peptizing agent in an amount forming only a fraction of the amount stoichiometrically necessary for the formation of the normal metal salt and then subjecting the hydroxide again to a careful drying not impairing the water solubility of the product, said careful drying operations including the application of mild heat to said hydroxide and mixture, respectively.

9. The process of producing reversible colloidal metal hydroxides which comprises causing a salt of a trivalent metal selected from the group consisting of aluminium, chromium and iron and having an acid radical which can be bound with ammonia to act on ammonia in excess, freeing the hydroxide obtained from the salt formed during the decomposition and then subjecting the hydroxide to a careful drying not impairing the water solubility of the product and then peptizing it by treating with a peptizing agent in an amount forming only a fraction of the amount stoichiometrically necessary for the formation of the normal metal salt while subjecting the mixture to a careful drying not impairing the water solubility of the product.

10. The process of producing reversible colloidal metal hydroxides which comprises causing a salt of a trivalent metal selected from the group consisting of aluminium, chromium and iron to act on an "ammonia substance" capable of binding the acid radical of the metal salt, said acid radical being capable of being bound by said ammonia substance with the formation of trivalent hydroxide in an amount deviating from the stoichiometrical ratio of the component, separating the liquid constituents from the reaction mixture, subjecting the solid residue to a careful drying not impairing the water solubility of the product, said careful drying including the application of mild heat to said residue, washing the mass and peptizing it by treating with a peptizing agent in an amount forming only a fraction of the amount stoichiometrically necessary for the formation of the normally metal salt.

11. The process of producing reversible colloidal metal hydroxides which comprises causing a salt of a trivalent metal selected from the group consisting of aluminium, chromium and iron to act on an "ammonia substance" capable of binding the acid radical of the metal salt, said acid radical being capable of being bound by said ammonia substance with the formation of trivalent hydroxide in an amount deviating from the stoichiometrical ratio of the component, separating the liquid constituents from the reaction mixture, subjecting the solid residue to a careful drying not impairing the water solubility of the product, stirring the resulting mass with the formerly separated liquid, separating again the liquid constituents from the mixture, washing the solid residue and subjecting it to a careful drying not impairing the water solubility of the product, said careful drying operations including the application of mild heat to said residues, and peptizing the mass by treating with a peptizing agent in an amount forming only a fraction of the amount stoichiometrically necessary for the formation of the normal metal salt.

FRITZ STOEWENER.

---

CERTIFICATE OF CORRECTION.

Patent No. 2,163,922.            June 27, 1939.

FRITZ STOEWENER.

It is hereby certified that error appears in the printed specification of the above numbered patent requiring correction as follows: Page 3, first column, line 16, claim 7, strike out the word "its" and insert the same after "impairing" in line 15, same claim; and second column, line 6 claim 9, after "product" and before the period, insert the comma and words , said careful drying operations including the application of mild heat to said hydroxide and mixture, respectively; and that the said Letters Patent should be read with this correction therein that the same may conform to the record of the case in the Patent Office.

Signed and sealed this 26th day of December, A. D. 1939.

(Seal)            Henry Van Arsdale,
Acting Commissioner of Patents.